UNITED STATES PATENT OFFICE.

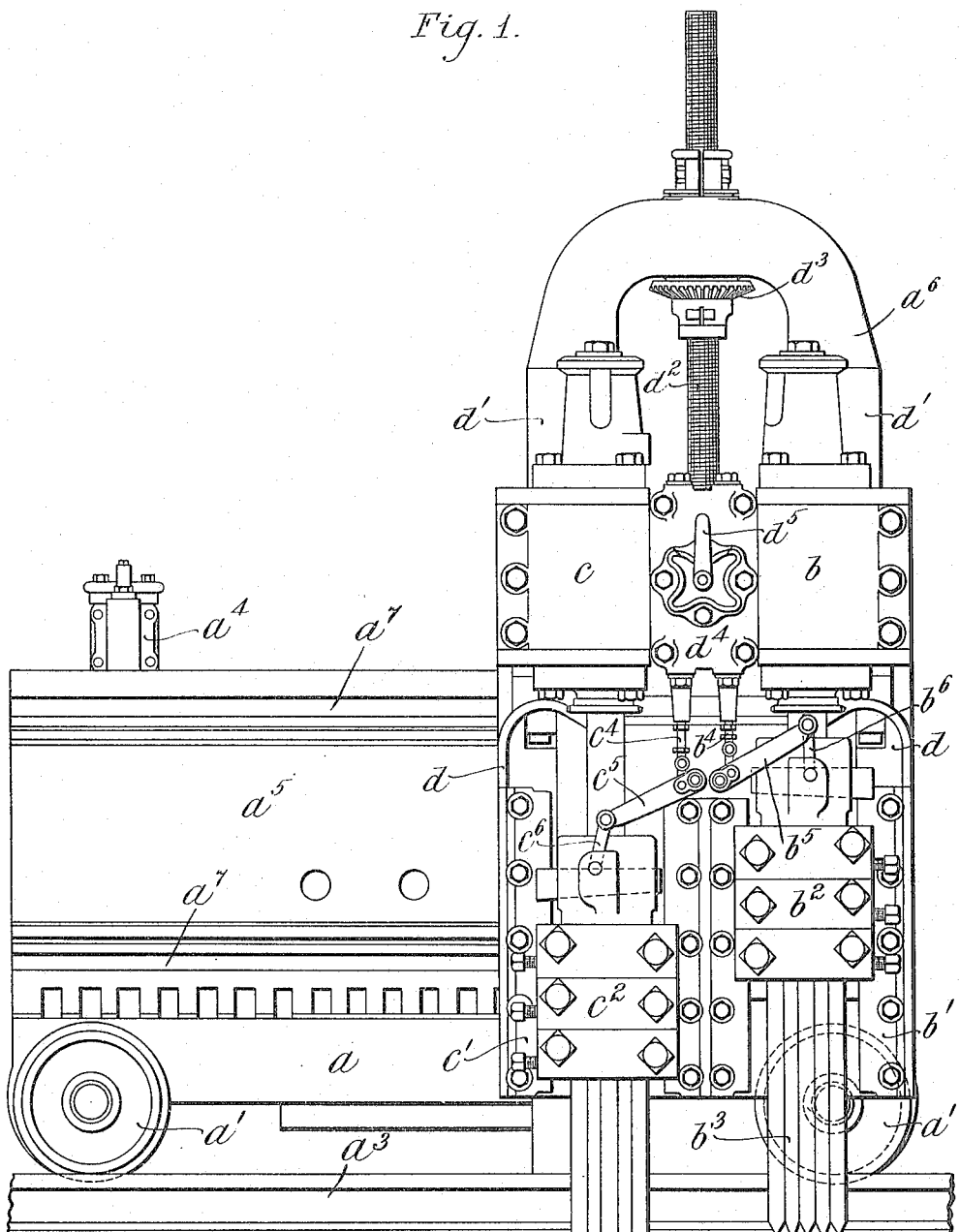

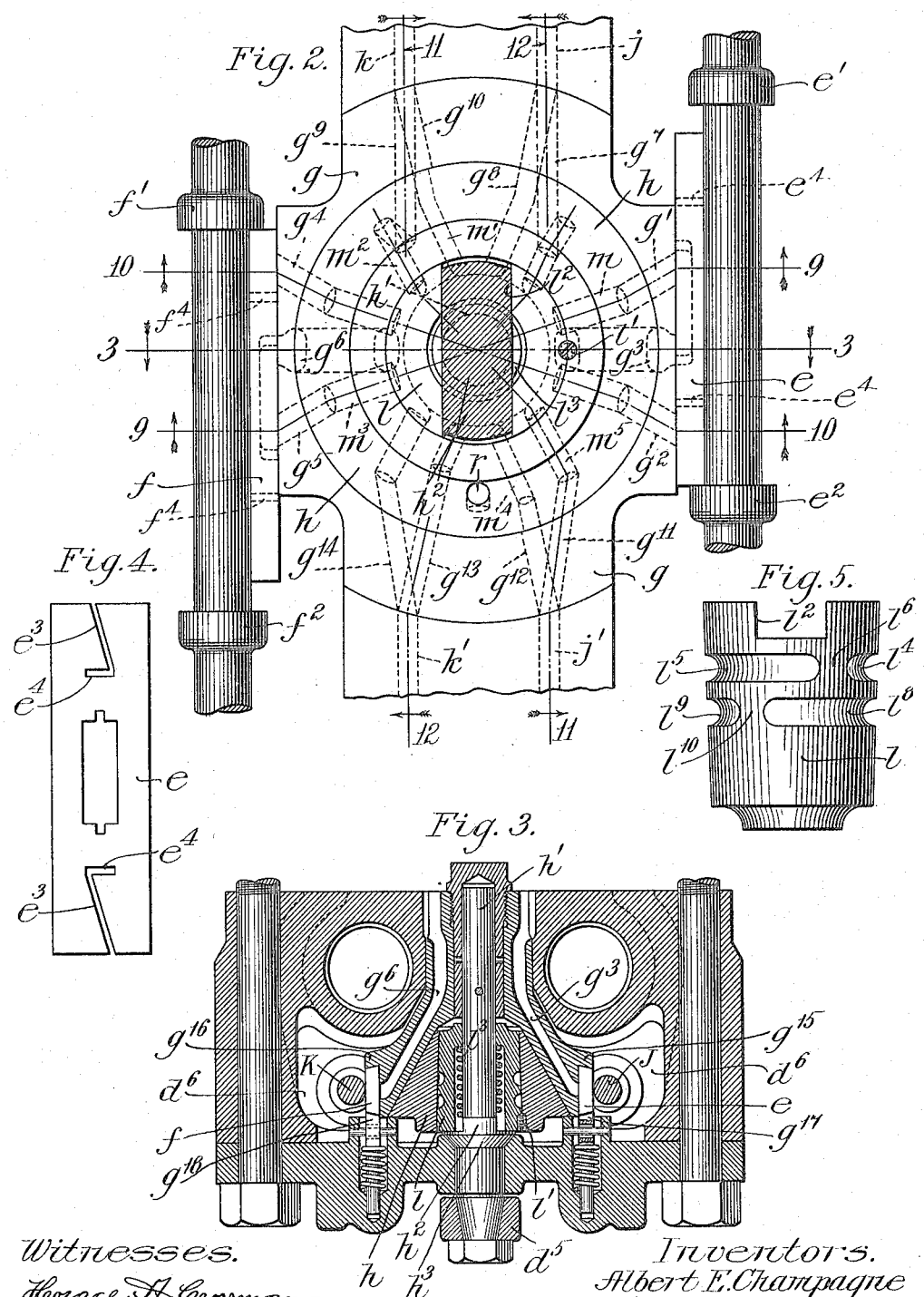

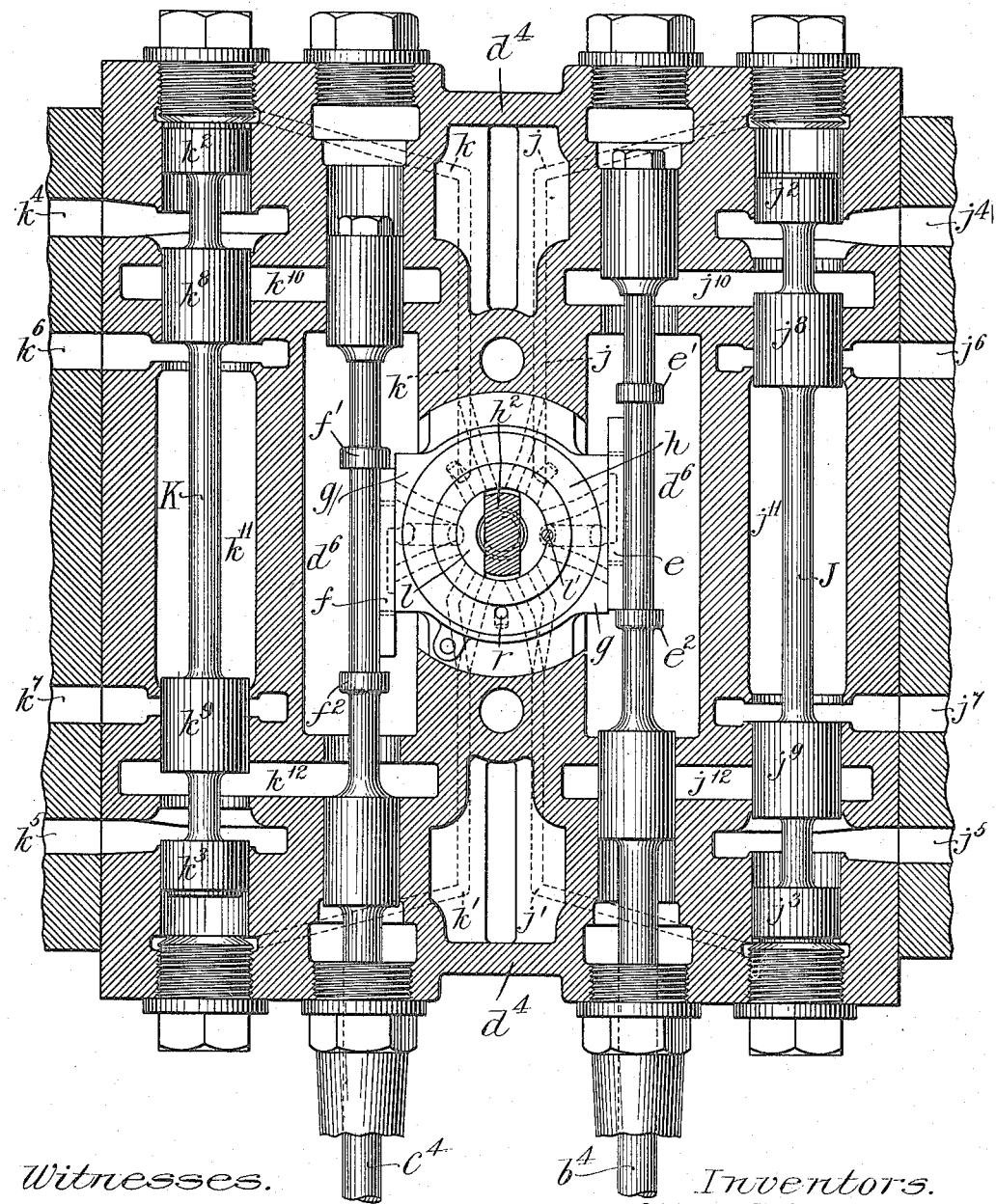

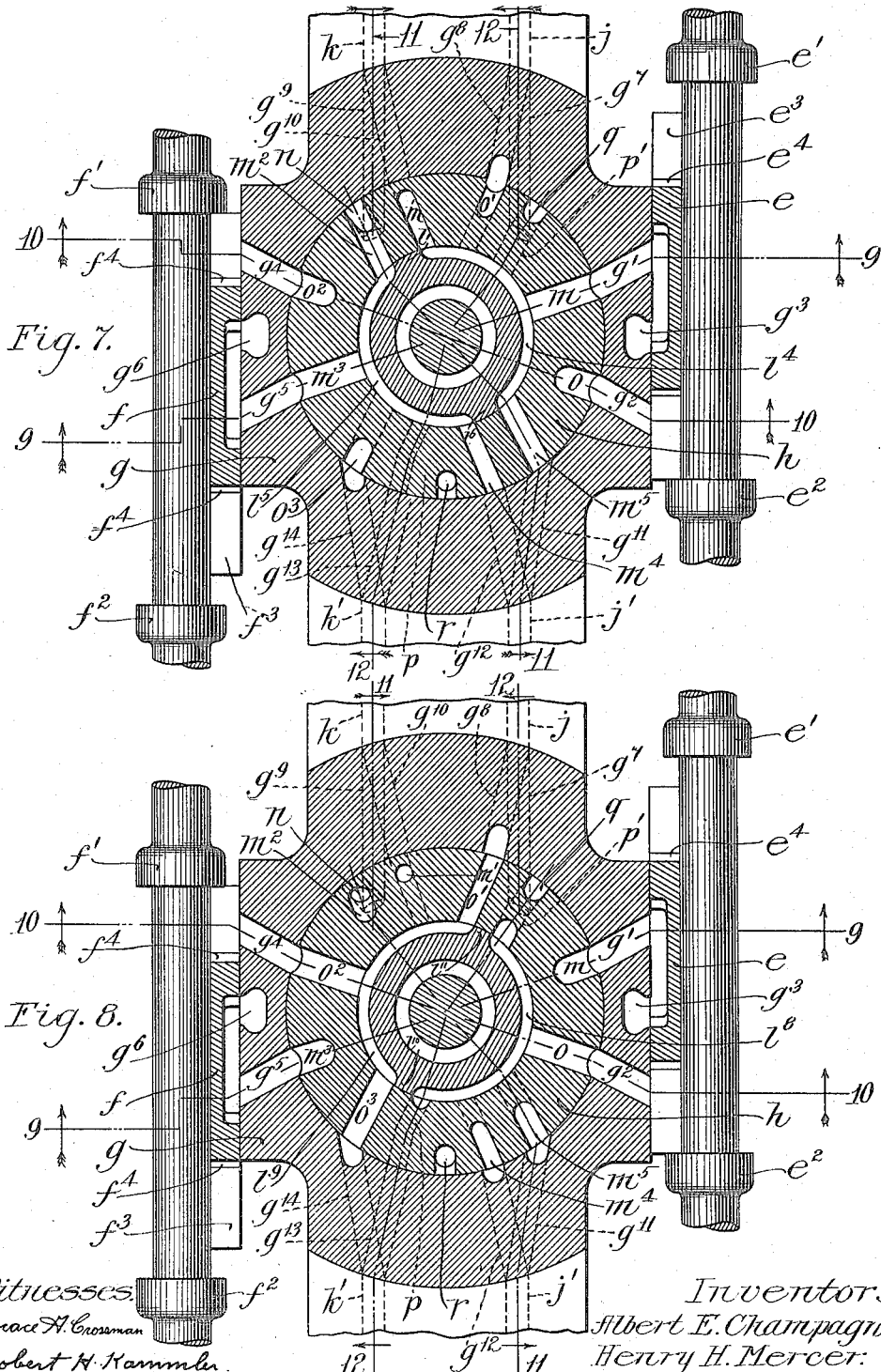

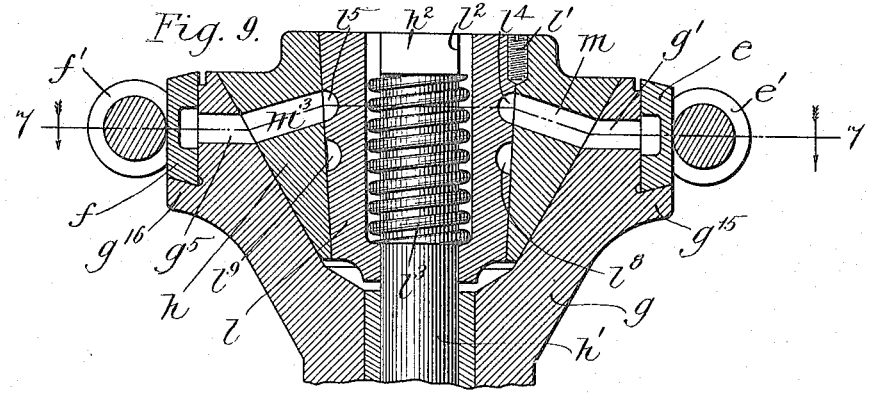
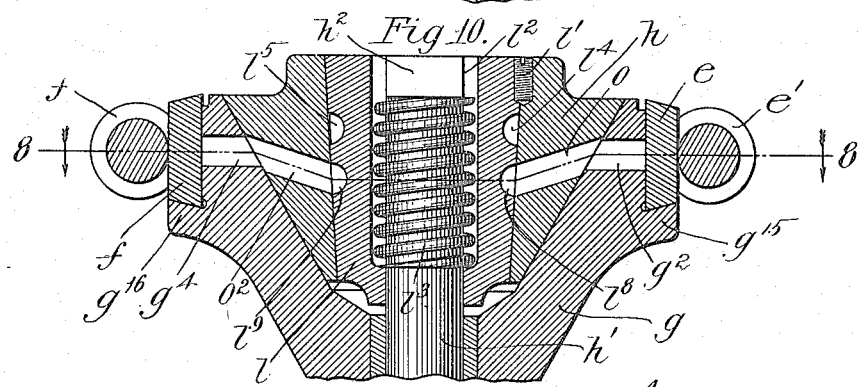
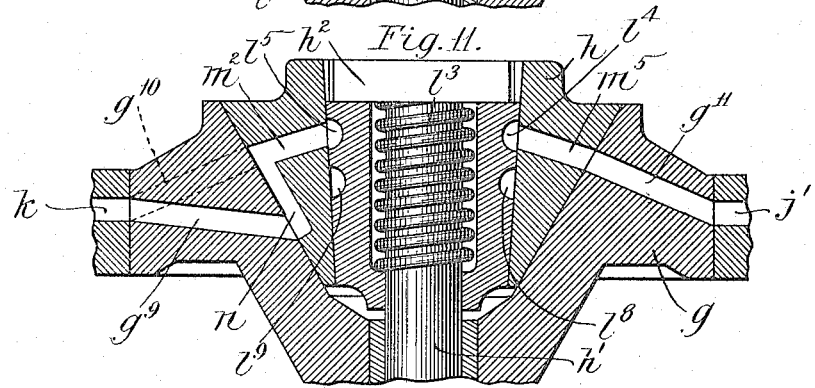
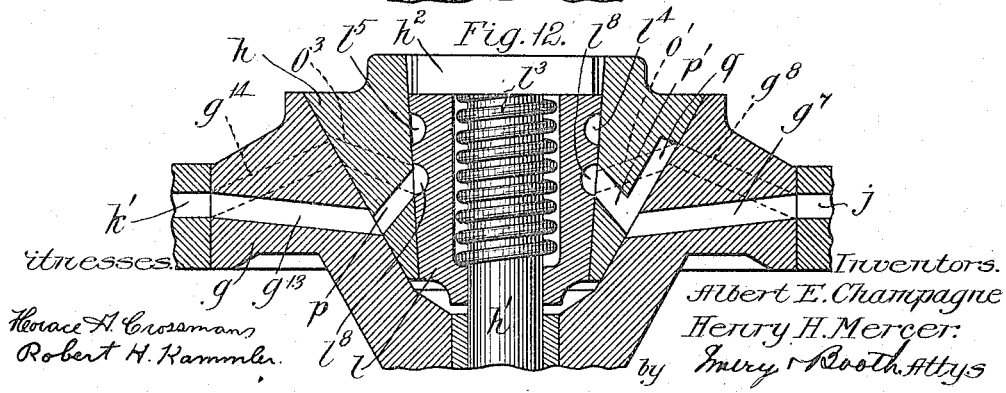

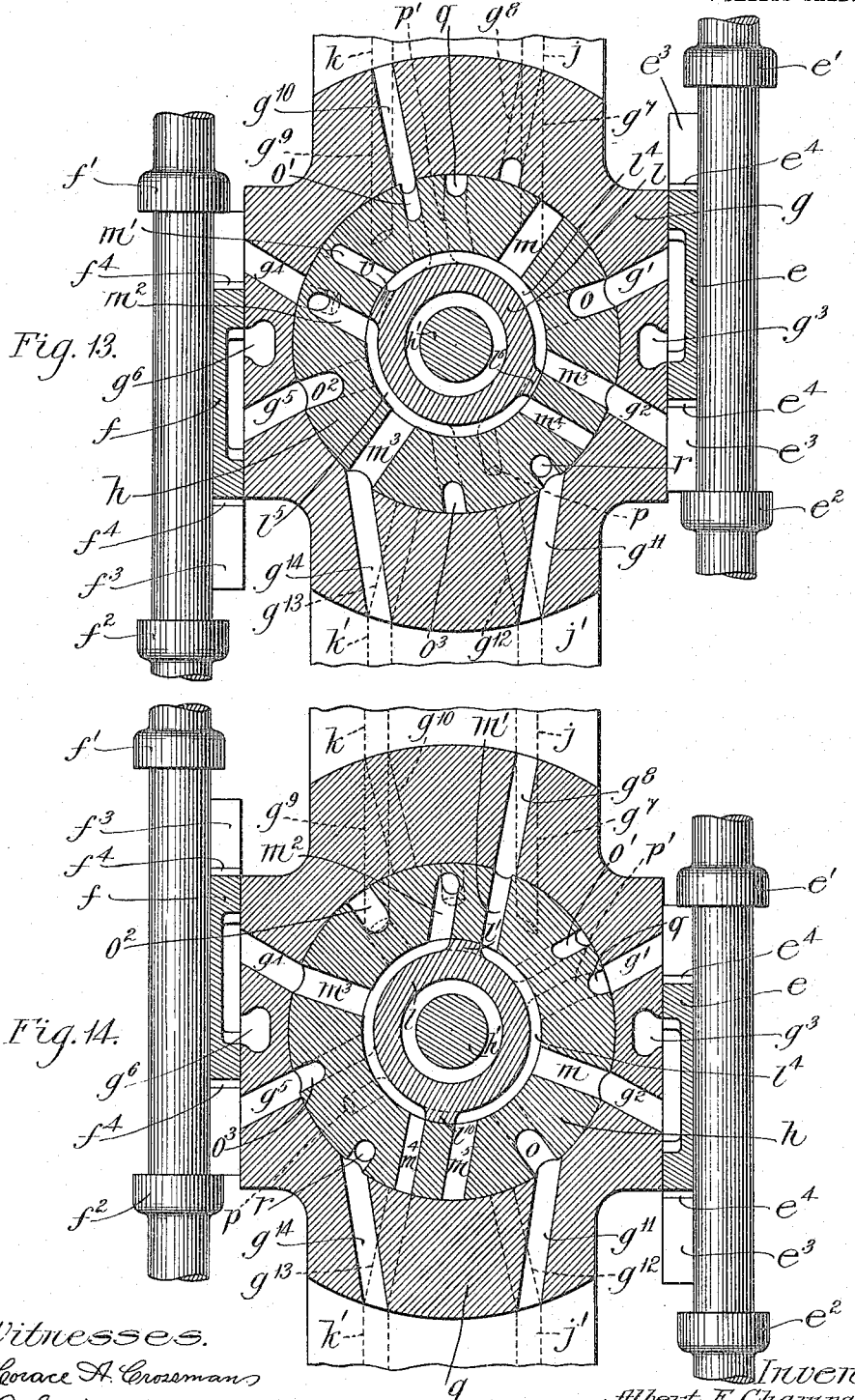

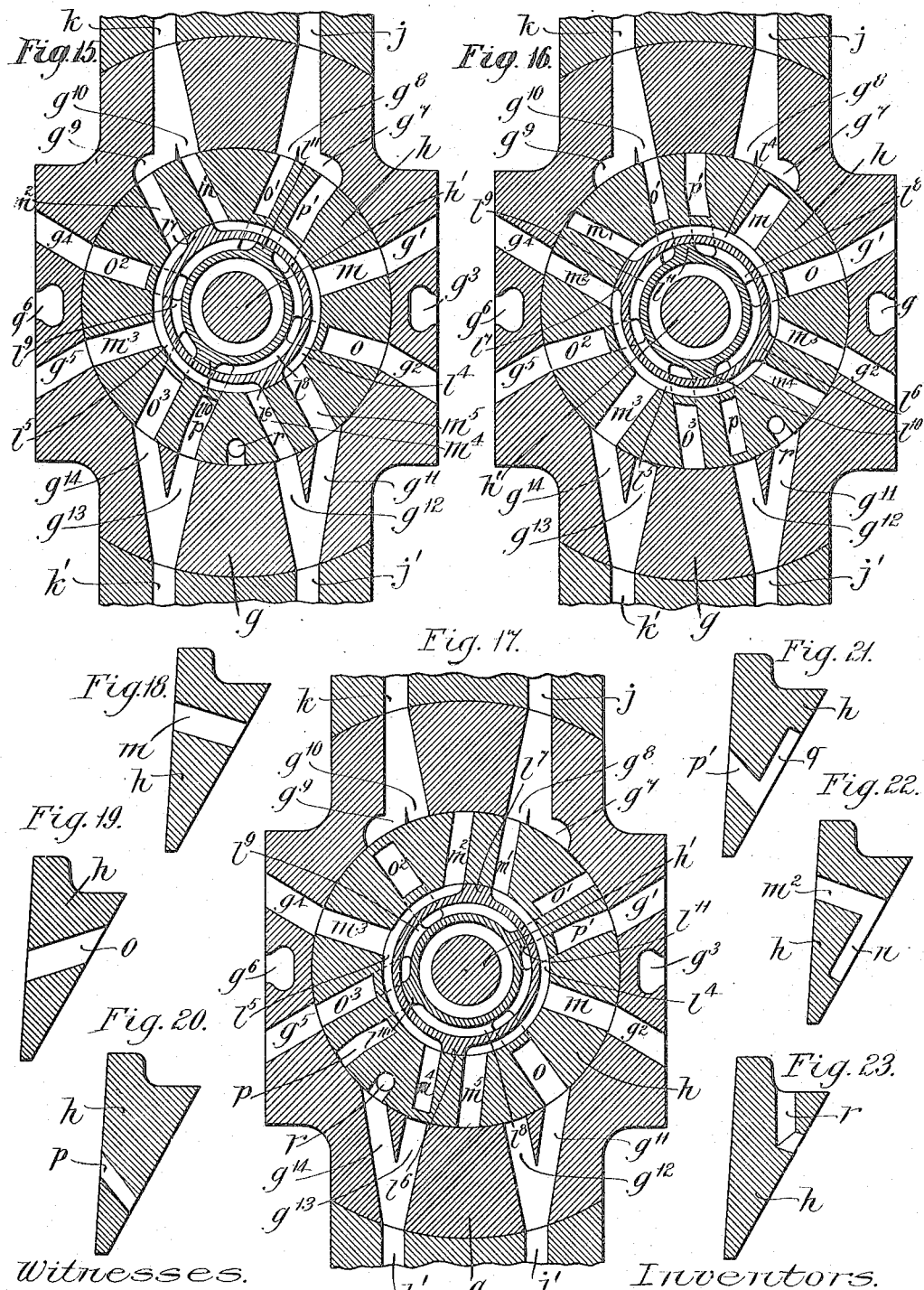

HENRY H. MERCER AND ALBERT E. CHAMPAGNE, OF CLAREMONT, NEW HAMPSHIRE, ASSIGNORS, BY MESNE ASSIGNMENTS, TO SULLIVAN MACHINERY COMPANY, OF BOSTON, MASSACHUSETTS, A CORPORATION OF MASSACHUSETTS.

TOOL-ACTUATING DEVICE.

1,131,256. Specification of Letters Patent. Patented Mar. 9, 1915.

Application filed April 8, 1909. Serial No. 438,588.

*To all whom it may concern:*

Be it known that we, HENRY H. MERCER and ALBERT E. CHAMPAGNE, citizens of the United States, and residing at Claremont, in the county of Sullivan and State of New Hampshire, have invented an Improvement in Tool-Actuating Devices, of which the following description, in connection with the accompanying drawings, is a specification, like letters on the drawings representing like parts.

Our invention relates to tool-actuating devices, and more particularly, though not exclusively, to engines or other tool-actuating devices directly connected for the reciprocation of a tool or tools employed in connection with quarry and mine working machines or the like.

Our invention will be best understood by reference to the following description when taken in connection with the accompanying illustration of one specific embodiment thereof, while its scope will be more particularly pointed out in the appended claims.

In the drawings: Figure 1 is a front elevation of a stone channeling machine embodying one form of our invention; Fig. 2 is an elevation, on an enlarged scale, showing the reversing valves for the channeler engines shown in Fig. 1 and also the main distributing valve; Fig. 3 is a section in plan taken transversely on the line 3—3 in Fig. 2 through the valve chambers of the engines, but on a reduced scale; Fig. 4 is a detail in plan of one of the reversing valves; Fig. 5 is a detail in side elevation of the center piece or core of the distributing valve; Fig. 6 is a sectional elevation of the valves and connecting ports for the two engines, shown for convenience all in the same plane and without regard to their true positional relation; Fig. 7 is a transverse section in elevation taken through the distributing valve on the line 7—7 in Fig. 9; Fig. 8 is a similar section taken on the line 8—8 in Fig. 10; Fig. 9 is a central longitudinal section in plan taken through the distributing valve on the line 9—9 in Figs. 2, 7 and 8 looking in the direction of the arrows; Fig. 10 is a similar section taken on the line 10—10 in Figs. 2, 7 and 8 looking in the direction of the arrows; Fig. 11 is a section in side elevation on the line 11—11 in Figs. 2, 7 and 8 looking from the left; Fig. 12 is a section on the line 12—12 in Figs. 2, 7 and 8 looking from the right; Fig. 13 is a section similar to the section in Fig. 7, but with the valve in a different position; Fig. 14 is a similar section with the valve in still a third position; Figs. 15, 16 and 17 are sections diagrammatical in their nature, but showing the relation of the ports for the three different positions of the valve; and Figs. 18 to 23 inclusive are additional details showing the arrangement of the various types of transverse passages through the distributing valve.

Referring to the drawings, and first more particularly to Fig. 1, for the sake of illustrating one concrete embodiment of our invention we have there shown the same as applied to one form of track channeling machine, the latter employing a pair of pressure-fluid-actuated engines for reciprocating the two gangs of tools. It is to be understood, however, that such application of the invention is illustrative only and that the same may be usefully applied to other stone working tools and to other tool actuated devices, as well as tool actuating units of other types and constructions than the pressure fluid engines herein illustrated. Referring first to the details of the channeler, the latter is provided with a main truck or frame $a$ having the wheels $a'$, the latter adapted to move upon the rails $a^3$ laid upon the quarry bottom. The truck carries a truck driving motor or engine shown at $a^4$ in Fig. 1, the latter being preferably connected through driving connections usual in this type of apparatus to propel the truck under its own power along the trackway, but not herein shown. While the channeling units may be carried on the truck in any suitable manner, there is herein shown supported at its working side the supporting plate $a^5$ on which is adjustably mounted the upright standard $a^6$. As is usual in this type of apparatus, the plate and standard may be tipped back at an angular inclination through connections not herein shown in detail, but well-known in machines of this class. Horizontal T-slots $a^7$ are provided, to which the standard $a^6$ is bolted, but along which it may be adjusted to either end of the truck or any intermediate position. Referring now to the channeling units, the latter are two in number, although more may be employed if desired. While, as stated, other forms of motive devices for reciprocating the tools may be employed, we have herein shown for that purpose pressure fluid engines to which compressed air, steam or other fluid may be supplied from any suitable source, not shown. The engines have cylinders $b$ and $c$, and these, together with the cross-head guides $b'$ and $c'$, which act to guide the tool-carrying cross-heads $b^2$ and $c^2$, are all mounted upon and carried by a vertically adjustable frame $d$. The latter is gibbed to slide upon longitudinally finished ways $d'$ upon the standard and the cylinder casting has its upper end secured to the lower end of the feed adjusting screw $d^2$ so that the latter may act to advance or retract the frame together with the cylinder, and thereby adjust the gangs $b^3$ and $c^3$ toward or away from the work. Movement may be imparted to the feed screw by means of the beveled gear $d^3$ connected to suitable driving mechanism by devices well-known in this class of apparatus and the channeler may be fitted with any of the usual mechanisms common to such machines. In the described embodiment of our invention the two tool units are so constructed as to have the capacity for working normally in an out-of-step relation and preferably in substantial opposition, thereby tending to cause each to offset the unbalancing or reactionary effect of the other. Preferably also not only are the two units so constructed that they may be operated either one while the other is held inactive, but preferably they are also so arranged that, when in simultaneous operation, if the action of one unit is interrupted, by the tool gang sticking in the cut, or for any other cause, the remaining one will continue its percussive action, thereby tending to set free the tool gang of the first unit and preferably also pressure fluid will continue to be applied to the first tool unit tending to restore it to its active position. While our invention is broadly applicable to tool-actuating devices of other forms, herein, where, for purposes of illustration, we have shown the same as applied to pressure fluid engines, this object is effected by the provision of a main or distributing valve of special design. Referring now to the controlling valves for the two engines, while these may have any desired construction, we have herein provided for each cylinder a main pressure-actuated valve of the piston type and a separate reversing valve for controlling each piston valve, there being provided also a main controlling or distributing valve by which the operative relation existing between the reversing valves and their pressure-actuated piston valve may be altered at will. The valves (Fig. 1) are arranged in a valve chamber $d^4$ between the two cylinders $b$ and $c$. The right-hand reversing valve (looking toward the machine in Fig. 1) has its stem $b^4$ connected to the lever $b^5$, which latter has one end pivoted to the frame $d$ and its opposite end connected by a link $b^6$ to the right-hand cross-head $b^2$. Similarly, the stem $c^4$ of the left-hand reversing valve is connected by means of the pivoted lever $c^5$ and the link $c^6$ with the left-hand cross-head $c^2$. By this means the downward movement of the right-hand cross-head causes downward movement of the right-hand reversing valve, and, likewise, the downward movement of the left-hand cross-head causes downward movement of the left-hand reversing valve. During the normal operation of the machine the main controlling or distributing valve, the handle for which is represented at $d^5$ (Fig. 1), is so placed that the reversal in the movement of each engine is due to the combined effects of both reversing valves, the various controlling factors being so arranged that a reversal of one piston from a downward to an upward movement takes place at or about the time of change of the remaining one from an upward to a downward movement,—the two units, in other words, being caused to move in an opposed out-of-step relation.

Referring to Figs. 2 to 6, the arrangement of valves by which the foregoing operation is accomplished will be clear and, since the construction and operation of the two sets of valve elements are substantially the same, it will be necessary to describe in detail one set only. Compressed air or other pressure fluid being admitted to the common pressure chamber $d^6$ (Fig. 3) within the valve casing $d^4$, through which chamber the stem of each reversing valve passes, it is then admitted alternately to each main valve chamber under the control of the reversing valves $e$ and $f$, the latter shown in detail in Fig. 4. Referring to the reversing valve $e$, the latter works between upper and lower abutments $e'$ and $e^2$ upon the valve stem $b^4$ and is preferably, though not necessarily, engaged by the latter with a certain amount of lost motion so as to be given a quick up or down movement along its seat on the valve block $g$ near the close of the up or down movement respectively of the cross-head. The valve block is provided at the right-hand side (Figs. 2 and 7) with valve-controlled passages comprising an upper passage $g'$, a lower passage $g^2$ and an intermediate passage $g^3$, the latter connected (Fig. 3) with the exhaust. At its opposite or left-hand side the valve block is similarly provided with upper and lower passages $g^4$ and $g^5$ and an intermediate exhaust passage $g^6$. The valve block is provided with a tapered or cone-shaped seat for the central distributing valve $h$ and at its top and bottom is provided with several sets of passages, the individual members of which open into the tapered seat at different levels. Referring to such passages (Figs. 2 and 7), at the upper right-hand side there are provided passages $g^7$ and $g^8$ opening into the valve seat (see Fig. 12) at lower and upper levels respectively (having reference to the sectional views shown in the drawings) and merging into a single passage $j$ which leads through the valve casing to the upper end (see Fig. 6) of the main valve J for the right-hand engine. At the upper left-hand side of the valve block the latter is provided with a pair of branched passages $g^9$ and $g^{10}$ which open at the tapered valve seat (see Fig. 11) at lower and higher levels respectively, and at their opposite ends merge into the passage $k$, the latter (Fig. 6) leading to the upper end of the main controlling valve K for the left-hand engine. At the lower right-hand end of the valve block the latter is provided with branched passages $g^{11}$ and $g^{12}$ which open into the valve seat at the same level (Fig. 8) and merge into the passage $j'$ leading to the lower end of the main controlling valve J for the right-hand engine. At the left-hand lower side of the valve block the latter is provided with branched passage $g^{13}$ and $g^{14}$ opening upon the tapered valve seat respectively at lower and higher levels (see Fig. 12) and merging into the passage $k'$, which latter leads down through the walls of the valve casing to the lower end of the main valve K for the left-hand engine. The individual members of the several sets of branched passages open upon the tapered valve seat at different points circumferentially about the same and, taken in connection with the lateral valve-controlled passages $g'$, $g^2$, $g^3$, $g^4$, $g^5$, referred to, they present to the distributing valve $h$ a series of circumferentially spaced ports arranged at two different levels, the passages $g'$, $g^2$, $g^4$, $g^5$, $g^8$, $g^{10}$, $g^{11}$, $g^{12}$ and $g^{14}$, being arranged at the upper level and the passages $g^7$, $g^9$ and $g^{13}$ being arranged at the lower level. It will, of course, be understood that the terms "upper" and "lower" and "right" or "left" are used merely as convenient terms of reference with relation to the figures of the drawings and are without further significance as to the relation in which the ports or passage may or do occupy to the apparatus when in use. Before describing the arrangement of passages in the distributing or controlling valve $h$ for controlling the connections between the various passages in the valve block reference will first be had to the construction of the main controlling valves for the engines and the engine ports controlled by the same.

Referring to Fig. 6 the right-hand pressure-actuated valve J is provided with spools $j^2$ and $j^3$ working in chambers to the ends of which the upper and lower passages $j$ and $j'$ lead, so that, when the lower passage is connected to the exhaust and the upper passage to the admission, the valve is caused to descend to the position shown in Fig. 6. When the connections are reversed the valve rises to a reverse position or that occupied by the valve K for the left-hand engine. The upper admission passage for the right-hand cylinder is represented at $j^4$ in Fig. 6 and the lower admission passage for the opposite end of the cylinder at $j^5$, the upper exhaust passage being shown at $j^6$ and the lower passage at $j^7$. The controlling valve is also provided with upper and lower spools $j^8$ and $j^9$, respectively, which control the upper and lower exhaust passages referred to, and, in the depressed position of the valve represented in Fig. 6, serve to admit pressure fluid from the pressure port $j^{10}$ of the main valve to the upper admission passage $j^4$ and connect the lower exhaust passage with the central exhaust space $j^{11}$, which space is permanently connected with the engine exhaust. On the other hand, when the valve is lifted, pressure fluid is admitted from the lower pressure port $j^{12}$ of the main valve to the cylinder through the passage $j^5$, this resulting in subsequent reversal of the piston movement. The valve K and the controlled and controlling ports and passages thereof are of the same general construction and arrangement as the valve J and its ports and passages.

As will be more fully described, the distributing valve $h$ is provided with passages such that, with the engine working in its normal condition as a duplex engine each reversing valve acts not only to admit pressure fluid to one end of the corresponding controlling valve and exhaust pressure fluid from the opposite end, but to exhaust fluid from and admit pressure fluid to the opposite ends, respectively, of the remaining valve. That is to say, near the end of the downward movement of the left-hand piston, which movement terminates at about the same time as the upward movement of the right-hand piston, the reversing valves $f$ and $e$ serve to admit pressure to both passages $k'$ and $j$ and exhaust pressure fluid from both passages $j'$ and $k$, thereby both contributing to the elevation of the controlling valve K and the depression of the valve J.

The reversing valve $e$ is provided at each end with a diagonal slit $e^3$ (Fig. 4) terminating in a transverse slit $e^4$ which so aline with the valve block passages $g'$ and $g^2$ that a quick admission is provided for those passages, acting quickly to reverse the main valve soon after the initial movement of the reversing valve. The reversing valves $e$ and $f$ are held to their seats by sliding contact, respectively (Fig. 3), with beveled walls $g^{15}$ and $g^{16}$ on the valve block, and are pressed thereagainst each by the head of a spring-pressed pin $g^{17}$ or $g^{18}$ engaging the opposite edge of the valve.

Referring now to the construction of the distributing valve $h$, the latter is provided with an inner core or plug $l$ (Fig. 5) having a tapered seat in the valve and secured within the same in fixed position as by the pin $l'$ (Fig. 3). The valve is provided with a stem $h'$ which extends outward through the walls of the valve casing where it has attached the handle $d^5$ by which it may be turned. The stem is provided with a tapered shoulder $h^3$ and the key piece $h^2$, the latter seated in a slot $l^2$ in the inner core $l$ so as to be capable of turning the valve, and there is preferably provided means, such as the spring $l^3$ seated in a pocket in the core and bearing against the key piece on the stem, which spring tends to keep seated the core and its valve. To connect the valve block passages for the operation of the engines in opposed step, as described, and for their single or individual operation as referred to, the valve $h$ is provided with various cross passages which emerge at the outer face of the valve at the level of one or the other of the two sets of valve block passages described, the said cross passages being interconnected through interior chambers or conduits formed between the core $l$ and the valve $h$. The cross passages are so arranged as to form series of circumferential ports at different levels acting to effect the desired connections between the valve block passages. Referring now to the detailed arrangement of the passages within the valve, the core of the latter is provided at an upper level with two circumferentially grooved portions $l^4$ and $l^5$, each of which extends not quite half way around the core, being separated from each other by the uncut wall portions $l^6$ and $l^7$ (see Figs. 5 and 7). At a lower level the valve core is also provided with similar grooves $l^8$ and $l^9$ separated by wall portions $l^{10}$ and $l^{11}$ (see Fig. 8), the wall portions $l^6$ and $l^7$ being offset circumferentially from the wall portions $l^{10}$ and $l^{11}$, so that each groove of either set overlaps both grooves of the remaining set. From an inspection of Figs. 7 to 14 inclusive it will be seen that these circumferential grooves form in effect interior circumferential chambers or passages which act to connect within the valve at different levels the transecting passages which open on the tapered exterior of the valve and which will now be described.

The valve is provided with six passages, $m, m', m^2, m^3, m^4$ and $m^5$ which cut through the annular walls of the valve and terminate in exterior ports arranged each at the upper level of the valve block passages. These upper level passages emerge on the interior of the valve at the upper level of one of the interior chambers $l^4$ or $l^5$, and have free communication with the one or the other of such chambers. The shape of such passages is represented in Fig. 18 and the various sectional views shown in Figs. 7 to 14 inclusive. Of these passages the passages $m$, $m'$ and $m^5$ all open into and communicate with the interior chamber $l^4$, while the passages $m^2$, $m^3$ and $m^4$ communicate with the interior chamber $l^5$. Of these passages the passage $m^2$ has its exterior port prolonged by a surface groove $n$ (see Fig. 22) so as to open the said passage $m^2$ also to a lower level and to that one of the lower set of valve block passages with which it may be turned into circumferential alinement. In addition to the described passages which connect the upper set of valve block ports with the upper set of interior chambers, four passages are also provided, namely, $o, o', o^2$ and $o^3$ which connect the upper set of valve block ports with the lower set of interior chambers $l^8, l^9$. The shape and inclination of such passages is shown in Fig. 19 and in the several sectional views submitted. Of these passages (see Fig. 8) the passage $o$ opens into the interior chamber $l^8$ and the passages $o', o^2$ and $o^3$ into the interior chamber $l^9$. Furthermore, passages $p$ and $p'$ (Figs. 20 and 21) are provided which cut through from the outer to the inner walls of the valve at such an angle as to present each an exterior port at the lower level of the valve block passages and to emerge on the interior of the valve at the level of the inner chambers $l^8$ and $l^9$. The exterior port of the passage $p'$ (see Fig. 21) is extended by means of the groove $q$ to the upper level of the valve block passages. In addition to the described passages in the valve, there is also provided (see Fig. 23) a live pressure passage $r$ which opens on the tapered walls of the valve into an exterior port at the upper level and has its opposite end open to the outer face of the valve which is exposed to the pressure fluid in the valve chamber, so that such port acts to admit live pressure fluid to any of the valve block passages with which its port may be brought into registration.

The operation of the engines, when the distributing valve is set at its mid-position for the out-of-step but simultaneous actuation of both gangs of tools, will now be readily understood. The relation of the various passages of the valve to those of the valve block is represented in the sectional Figs. 7 to 12 inclusive and in the more purely diagrammatic representation in Fig. 15. Taking the position of the two reversing valves $e$ and $f$ shown in Fig. 7, pressure fluid is being admitted at one side to the valve block passage $g^2$ whence it passes through the valve passage $o$ into the chamber $l^8$ (Fig. 8). From the passage $l^8$ it is distributed part through the passage $p$ (see Fig. 12), valve block passage $g^{13}$ and passage $k'$ to the bottom of the left-hand controlling valve K and part through the valve passage $p'$ (Fig. 12), valve block passage $g^7$ and passage $j$ to the top of the right-hand controlling valve J. At the same time pressure fluid is being admitted also to the top of the controlling valve J and the bottom of the controlling valve K, such admission taking place through the valve block passage $g^4$ (Figs. 8 and 10), the valve passage $o^2$ to the chamber $l^9$ whence it is delivered part through the valve passage $o^3$ (see Fig. 12) and valve block passage $g^{14}$ to the passage $k'$ and part through the valve passage $o'$, valve block passage $g^8$ to the passage $j$. Simultaneously both reversing valves are effective for exhausting pressure from the top of the controlling valve K and the bottom of the controlling valve J. From the top of the valve K the exhaust takes place through the passage $k$ and thence part through the valve block passage $g^{10}$ (Figs. 7 and 11), valve passage $m'$, circumferential groove $l^4$, valve passage $m$, valve block passage $g'$ and thence under the bridge of the valve and through the exhaust passage $g^3$. The remainder of the exhaust from the passage $k$ passes through the valve block passage $g^9$, valve groove $n$ (see Fig. 11), valve passage $m^2$, circumferential groove $l^5$ and thence through the valve passage $m^3$, valve block passage $g^5$ and the bridge of the valve to the exhaust port $g^6$. The exhaust from the bottom of the controlling valve J at the same time takes place through the passage $j'$, whence part passes through the valve block passage $g^{11}$, valve passage $m^5$ to the chamber $l^4$ where it joins the exhaust from the passages $k$ and $g^{10}$. The remainder of the exhaust passes through the valve block passage $g^{12}$, the valve passage $m^4$ to the chamber $l^5$ where it joins the already mentioned portion of the exhaust from the passages $k$ and $g^9$.

From the described arrangement it will be seen that the passages leading from the respective opposite ends of both controlling valves are branched so that each reversing valve controls a member of each set of branched passages, thereby admitting, each irrespective of the other, pressure fluid to the upper end of one controlling valve and the lower end of the other, and, at the same time, exhausting pressure fluid from the lower end of the first and the upper end of the second. As the engines move and the reversing valves are thereby also moved to a reversing position, the passages previously connected with the pressure fluid then become connected with the exhaust and vice versa, so that reverse conditions then prevail as to admission and exhaust, pressure fluid being then effective in raising the right-hand controlling valve and lowering the left-hand valve. The described arrangement of controlling passages insures the movement of the pistons in opposed step, and from whatever position they start they immediately drop into opposition and keep such relation during operation of the engine.

In devices of this class employing a percussive tool it frequently happens that, by reason of soft or hollow spots, one of the tool gangs in delivering its blow will stick in the cut so that its engine cannot at first withdraw it. Through the arrangement of ports herein provided if one gang of tools becomes stuck and stops moving its piston will not only continue to have pressure fluid pulsatingly applied to its opposite sides tending to displace the same, but the remaining piston with its tool will still continue to be reciprocated in the cut, all of which tends quickly to loosen and set free the tool gang held therein. This is accomplished herein by causing the pressure control exercised over the controlling valves J and K by that reversing valve $e$ or $f$ which remains in motion to preponderate over that exercised by the fixed or stuck reversing valve. By way of illustration, if the left-hand tool gang sticks in the cut, the reversing valve $f$ is then held fixed in its lowermost, or approximately lowermost, position. A condition is then established under which the lower end of the main valve J for the other engine and the upper end of the valve K is permanently connected with the exhaust through the ports controlled by the fixed reversing valve, while the upper end of the valve J and the lower end of the valve K are permanently connected with the admission so long as the tool gang remains stuck. During the downward stroke of the right-hand engine, its reversing valve $e$ opens the top and bottom of the valves J and K respectively to the exhaust, and the bottom and top respectively of the valves J and K to the admission. This, however, does not act as might be supposed to produce a balance in pressure conditions at opposite ends of the two controlling valves and without effecting the movement of the latter, but acts to reverse the position of both valves and the application of pressure fluid to reverse the movements of the pistons just as if both pistons were in motion, instead of one only. This is due to the fact that each reversing valve provides a maximum port opening for the live pressure fluid, which is designed to reverse the controlling valves at a point prior to the completion of the piston stroke in either direction. Such port opening is considerably reduced at the end of the piston stroke with the tool gang stuck, as it ordinarily is. With its piston near the bottom of the cylinder and its reversing valve well beyond the point of maximum port opening, the pressure effect of the moving reversing valve at the point of intended reversal is sufficiently superior to reverse both controlling valves. Referring to Figs. 2 and 4, it will be seen that the reversing valve $e$ first brings into registration with the admission port $g'$ or $g^2$ the transverse admission slit $e^4$, and that when this, together with a portion of the diagonal slit $e^3$, coincides with the admission port, maximum admission is obtained. This, however, is for an instant only, and as the valve passes on the admission becomes more restricted, and in the lowermost position of the valve, considerably more restricted. The exhaust port in the reversing valve may also be formed as shown, so as to restrict the exhaust passages when the reversing valve is adjacent its extreme position. Since the reversing valve passes very quickly over this reversing position of maximum port opening, and since the maximum port opening occurs at this one position only, it is practically impossible for the tools of one gang to become stuck in the cut without permitting the continued operation of both controlling valves so long as the remaining engine reciprocates. This action in practice effects the almost instant loosening of the stuck tool gang. There may be a moment's hesitation, but it receives such a pulling and pushing from the tool in operation that it becomes quickly loosened.

In starting up a machine of the described construction, both sets of tools are ordinarily hanging down in the cut with their respective pistons resting on the lower cylinder heads, and the controlling and reversing valves in their lowermost positions. This would appear to create conditions of balanced pressure at opposite ends of the controlling valves, and would seem to be an obstacle to starting the machine. Such, however, is not the case, since it is found in practice that with ordinary workmanship and the ports and passages supposedly of the same size and cross-sectional area, there will be a sufficiently greater resistance to the flow of the pressure fluid on one side or the other of any one set of branch passages, so that there will be an unbalancing of pressure at opposite ends of one or both controlling valves, and one or both of the latter will rise and start the machine, even though no special provision is made for this purpose. After having once started in operation, the two engines will quickly drop into step, since it is practically impossible for both reversing valves to pass the position of reversal at the same instant, or to continue thus to move at identically the same speed for more than one or two strokes. As soon as they are thrown into out of step relation, they are locked in such relation so long as they operate.

While, as above stated, no special construction is actually required to cause an unbalancing of pressure conditions when the machine is started up, since this will ordinarily occur in any event, in order to emphasize this feature, we have herein shown the valve block passages $o'$, $m'$, $m^4$, and $p$ smaller in diameter than the passages $p'$, $m^2$, $m^5$, and $o^3$, thereby rendering the latter somewhat more effective in that the pressure fluid has freer passage therethrough. With the passages referred to thus differentially formed, if both reversing valves are down, as they ordinarily would be when the machine is started up, the bottom of valve J would be connected with the admission through the larger port $m^5$ and with the exhaust through the smaller port $m^4$. With the inrush of pressure fluid, the pressure at the bottom of the valve would be increased. Conversely, the upper end of the valve is connected with the admission through the smaller port $o'$, and with the exhaust through the larger port $p'$, so that pressure thereat will be lowered. By reason of this differential port arrangement, therefore, the valve will be lifted in spite of the fact that both ends are simultaneously open to the admission and the exhaust. The same condition holds for the valve K, by reason of the difference in cross-sectional area of the ports $m'$ and $m^2$ on the one hand, and $p$ and $o^3$ on the other.

In order to run either engine independently of and without the operation of the other, means are provided whereby this may be accomplished by shifting or turning the distributing valve $h$. Such control over the cutting units becomes desirable in many instances. For example, in the channeling machine shown, in cutting the channel groove through the simultaneous operation of the two sets of tool gangs, when the end of the groove is reached, there is left a portion which has been subjected to the cutting action of the foremost tool gang only. Such portion is of lesser depth, and to cut the groove to a uniform depth it becomes necessary to operate the foremost channeler engine while withholding power from the remaining engine and lifting its tool gang up out of the cut. To throw out of operation the right-hand engine while still leaving the left-hand engine in operation, the distributing valve handle $d^5$ is turned to the left, thus moving the valve into the position represented in Fig. 13 and diagrammatically in Fig. 16. In this position it will be seen that the ports $p'$, $m'$, $o^3$ and $m^4$ are dead or closed, being out of registration or alinement with any of the valve block ports. The same is true of the ports $p$ and $m$, for, although in circumferential registration with the valve block passages $g^{12}$ and $g^7$ respectively, such registration is at different levels so that said passages are out of communication. In such position of the distributing valve, however, the reversing valve $f$ continues to control its main controlling valve K. In the position represented in Fig. 13, pressure fluid is being admitted through the valve block passage $g^4$, the valve passage $m^2$ to the inner circumferential groove $l^5$, whence it passes through the valve passage $m^3$, valve block passage $g^{14}$ to the lower valve controlling passage $k'$ to raise the controlling valve K. At the same time pressure fluid is being exhausted from the upper valve controlling passage $k$ through the valve block passage $g^{10}$, valve port $o'$, interior groove $l^9$, valve passage $o^2$, valve block passage $g^5$ and the exhaust port $g^6$. On the other hand, the connections between the controlling passages J and $j'$, for the right-hand controlling valve J are such as to provide for the continued admission of pressure fluid to the bottom of the controlling valve J to elevate the same, while shutting off pressure fluid from the top of said valve. This results in lifting the right-hand piston to the top of its cylinder and the right-hand tool gang out of the cut, maintaining the same in such position so long as the distributing valve is kept turned as described. Referring to Figs. 13 and 16 it will be seen that, while pressure fluid may enter the groove $l^4$ through the valve passage $m^5$, it has no escape, since the passages $m$ and $m'$ are closed, while the passages $g^7$ and $g^8$ leading to the top of the controlling valve are cut off from all valve passages, either exhaust or admission. Likewise, the groove $l^3$, while open to the exhaust through the passages $o$ and $g'$, is cut off from all the other passages in the valve block. In this position of the distributing valve, however, the live pressure passage $r$ is brought into connection with the valve block passage $g^{11}$ which connects with the lower valve controlling passage, thereby admitting live pressure directly from the valve chamber to the lower end of the said valve and keeping the controlling valve elevated. If the distributing valve handle is thrown to the right it assumes the position represented in Figs. 12 and 17 where pressure fluid is supplied to the right-hand engine to reciprocate the right-hand tool gang, while the left-hand engine is cut out of operation and its piston lifted to the top of the cylinder. The course of the pressure fluid will be evident from the description already given, but may be traced out as follows: In the down position of the reversing valve $e$ the pressure fluid enters the valve block port $g'$, passes through the exterior groove $q$ and valve passage $p'$ to the lower circumferential groove $l^8$, thence through the valve passage $o$ to the valve block passage $g^{11}$, whence it enters the lower valve controlling passage $j'$. On the other hand, the exhaust passing out through the upper valve controlling passage $j$ enters the valve block passage $g^8$, the valve passage $m'$ and the circumferential groove $l^4$, whence it exhausts through the valve passage $m$, valve block passage $g^2$ and exhaust port $g^3$. At the same time, the upper controlling passage $k$ for the left-hand controlling valve K and its branched connections $g^9$ and $g^{10}$ are shut off from connection with any of the valve passages, while the lower valve controlling passage $k'$ is connected to the live steam port $r$ and thereby receives pressure fluid to elevate the left-hand controlling valve and maintain the same elevated while the distributing valve is held in the position described.

It will be understood that, while we have herein shown our invention as applied to a particular form of stone working machine, the same may be embodied in other stone cutting appliances as well as in machines and engines other than those relating to the stone cutting art. It is also to be understood that we have herein shown specific details for the purpose of fully illustrating one embodiment of our invention, but that the same is not limited to the details herein shown, or to the form or relative arrangement of parts, but that extensive deviations may be made from the disclosure herein without departing from the spirit of the invention.

Claims:

1. In a channeling machine, the combination with a pair of channeling units each with its tool or gang of tools, means including independently operable controlling devices for synchronously insuring the operation of said tools in opposed step, and joint opposed step-controlling means for continuing the operation of either of said tool gangs in case of stoppage of the other.

2. In a stone-working machine, the combination with a pair of cutting units, joint controlling means including independently operable controlling devices for operating the same together in definitely timed relation, and means for insuring the continued operation of either one in case of stoppage of the other.

3. In a stone working machine, the combination with a pair of engines, cutting means operated by each engine, valves controlling said engines, and means for moving said valves to maintain said engine in out of step relation, said means providing for the continued operation of one engine in the event of the unintentional stoppage of the other.

4. In a duplex engine, the combination with a pair of cylinders each with its coöperating piston, a reversing valve for each, and coöperative connections between the valve for one engine and the other engine whereby said valve acts to control the movements of its own engine and of the other engine while maintaining them in out of step relation.

5. In a duplex engine, the combination with a pair of cylinders, each with its coöperating piston, a valve for each engine movable with the piston of such engine, there being provided within the control of each valve pressure fluid passages serving to admit controlling pressure fluid for the control both of its own and the other engine.

6. In a duplex engine, the combination with a pair of cylinders, each with its coöperating piston, a main valve for each, and a reversing valve, there being provided pressure fluid passages controlled by each reversing valve and leading to the valve chambers of both main valves, whereby each main valve is subjected to the conjoint control of the two reversing valves.

7. In a duplex engine, the combination with a pair of cylinders, each with its coöperating piston, a main valve for each and a reversing valve, there being provided differential pressure fluid passages controlled by each reversing valve and leading to the valve chambers of both main valves, whereby each main valve is subjected to the conjoint control of the two reversing valves.

8. In a duplex engine, the combination with a pair of cylinders, each with its coöperating piston, a main valve for each and a reversing valve, there being provided pressure fluid passages controlled by each reversing valve and leading to the valve chambers of both main valves, whereby each main valve is subjected to the conjoint control of the two reversing valves, said reversing valves providing for a maximum port opening prior to the end of its movement.

9. In a duplex engine, the combination with a pair of cylinders, each with its coöperating piston, a main valve and a reversing valve for each, there being provided pressure fluid passages controlled by each reversing valve, and leading to the valve chambers of both main valves, whereby each main valve is subjected to the conjoint control of the two reversing valves, said passages being connected to provide for the simultaneous opposite movements of the main valves whereby said engines are maintained in opposed step.

10. In a duplex engine, the combination with a pair of cylinders each with its coöperating piston, valve controlling means including two valves controlled by the joint movements of the two pistons, and means for making said valves subject to the predominating control of the moving piston in case of stoppage of the other for maintaining said pistons in out of step relation.

11. In a duplex engine, the combination with a pair of cylinders each with its coöperating piston, a controlling valve for each jointly moved by said pistons to maintain the engines in out of step relation, and moving means for said valves effective for continuing the movement thereof irrespective of the stoppage of one of said pistons only.

12. In a duplex engine the combination with a pair of cylinders each with its coöperating piston, a main valve for each and a reversing valve connection between the piston and its reversing valve to move the latter with the former, there being provided differential pressure fluid passages controlling each a reversing valve and leading to the valve chambers of both main valves, whereby each main valve is subjected to the conjoint control of the two reversing valves and the pistons maintained in out of step relation.

13. In a duplex engine the combination with a pair of cylinders each with its coöperating piston, a pair of controlling valves moved conjointly under the control of the two pistons, and means for forcing an out of step movement of the two pistons, when the said engine is started in operation.

14. In a stone-working machine, the combination of a pair of actuators, cutting means operated by each actuator, separate and distinct controlling devices for controlling said actuators, and means for moving said controlling devices to maintain said actuators in out of step relation, said means including devices providing for the continued operation of one of said actuators in the event of the unintentional stoppage of the other.

15. In a duplex machine, the combination of a pair of actuating units, each with its movable actuating element, a separate and distinct controlling device for each actuating unit connected to and movable with the actuating element of said unit, there being provided within the control of each controlling device energy-conducting means serving to supply power for the control both of its own and the other unit.

16. In a duplex machine, the combination of a pair of actuating units each with its movable actuating element, a main controlling device for each, and a separate reversing device for each, there being provided energy-conducting means controlled by each reversing device and leading to both of the main controlling devices, whereby each main controlling device is subjected to the conjoint control of the two reversing devices.

17. In a duplex machine, the combination of a pair of work-performing units, operating means therefor, and controlling means including separately operable devices having provision to supply power to one of said units alone for the continued operation thereof, while at the same time applying continued power to withdraw the remaining unit from the work.

18. In a duplex machine, the combination of a pair of work-performing units, a pair of separate controlling devices for exercising an independent control over such units, and means for normally synchronizing the operation of said units in opposed step relation through the control of said devices.

19. In a duplex machine, the combination of a pair of work-performing units, distinct and independent controlling devices for controlling the operation of said units independently of each other, and means for normally synchronizing the operation of such units in out-of-step relation through the control of said devices.

20. In a duplex machine, the combination of a pair of work-performing units, instrumentalities including independently operable means for insuring the continuous operation of either of said units irrespective of the operation of the other, and means for normally synchronizing the operation of said units in opposed step relation.

21. In a duplex machine, the combination of a pair of work-performing units, a pair of independent controlling devices for exercising an independent control over said units, and means for exercising a conjoint control over said units through the control of said devices.

22. In a duplex machine, the combination of a pair of work-performing units, main controlling means for conjointly controlling the operation of said units, and supplementary controlling means for exercising a control over each of said units, irrespective of the operation or nonoperation of the other.

23. In a duplex machine, the combination of a pair of work-performing units, each with its tool or gang of tools, means for operating said units in opposed step and joint opposed step causing means for controlling the continued operation of each of said tool gangs irrespectvie of the operation of the other.

24. In a duplex machine, the combination of a pair of work-performing units. each with its tool or gang of tools, means for operating said units in opposed step, and joint opposed step - controlling means for each unit, independent of the other, for controlling the operation of each of said tool gangs.

25. In a duplex machine, the combination of a pair of work-performing units, controlling means for normally causing a definitely-timed relative operation of said units, and means for causing the continued operation of either unit in the event of an interruption of the uormal working of the other.

26. A channeling machine comprising in combination a channeling unit having an elastic fluid actuated piston and its cylinder; an opposed channeling unit having an elastic fluid piston and its cylinder, and controlling means actuated by one unit and independent of movement of the other of said units to control admission of elastic fluid to its own cylinder and to the cylinder of said other unit.

27. A stone working machine comprising in combination a cutting unit; an opposed cutting unit operative in definitely timed relation to said cutting unit; independently actuated fluid actuated pistons for said cutting unit and said opposed cutting unit; elastic fluid controlling means to time the relative periods of operation of said cutting unit and said opposed cutting unit; and auxiliary ports coöperating with said elastic fluid controlling means to permit operation of either of said cutting units independent of movement of the other.

28. A duplex engine comprising in combination a cylinder; its coöperating piston; a coöperating cylinder; a piston therefor normally opposing said coöperating piston; a controlling valve operable by movement of the piston of said coöperating piston to control movement thereof; a second controlling valve operable by said opposed piston to control movement thereof; and crossover connecting means providing means for movement of either of said valves by movement of the piston which it does not control.

29. A channeling machine comprising in combination a channeling unit; its cylinder and piston; a coöperating channeling unit; its coöperating cylinder and piston; timing means including an independent valve for each unit operable by movement of one of said units effective to admit elastic fluid alternately to the opposite sides of the piston of the other channeling unit in the absence of valve controlling movement of said other channeling unit.

30. In a duplex engine, the combination of a pair of cylinders each with its coöperating piston and valve controlling means controlled by the joint movements of the two pistons and adapted normally to maintain opposed operation of said pistons; and pressure differentiating means providing a predominating control of either piston, when moving, over the other piston when stationary.

31. In a channeling machine a channeling unit; an opposed channeling unit; actuators for said units; and relative opposed step maintaining timing means including independent controlling devices actuated independently of either one of said units.

In testimony whereof, we have signed our names to this specification, in the presence of two subscribing witnesses.

HENRY H. MERCER.
ALBERT E. CHAMPAGNE.

Witnesses:
E. J. BRUCHARD,
J. A. BRUCE.

Copies of this patent may be obtained for five cents each, by addressing the "Commissioner of Patents, Washington, D. C."